United States Patent
Fernando et al.

(10) Patent No.: US 8,924,257 B2
(45) Date of Patent: Dec. 30, 2014

(54) GENERIC APPARATUS TO PROVIDE RFID READING FUNCTIONALITY TO COMPUTING DEVICE WITH NO BUILT IN RFID READER

(75) Inventors: Llavanya Fernando, San Jose, CA (US); Schayne Jallow, San Jose, CA (US); Sankalpa Gamwarige, Colombo (SL); Ushan Karunathilaka, Colombo (SL); Dilan Weerakkody, Colombo (SL); Dinuth de Zoysa, Colombo (SL)

(73) Assignee: Zone 24x7, San Jose, CA (US)

( * ) Notice: Subject to any disclaimer, the term of this patent is extended or adjusted under 35 U.S.C. 154(b) by 171 days.

(21) Appl. No.: 13/604,092

(22) Filed: Sep. 5, 2012

(65) Prior Publication Data

US 2013/0311314 A1    Nov. 21, 2013

Related U.S. Application Data

(60) Provisional application No. 61/688,463, filed on May 16, 2012.

(51) Int. Cl.
*G06Q 20/00* (2012.01)
*G06G 1/12* (2006.01)
*G06K 7/01* (2006.01)
*G06Q 20/20* (2012.01)
*G07G 1/00* (2006.01)
*G06Q 20/34* (2012.01)
*G06K 7/10* (2006.01)

(52) U.S. Cl.
CPC ............... *G06K 7/01* (2013.01); *G06Q 20/204* (2013.01); *G07G 1/0045* (2013.01); *G06Q 20/352* (2013.01); *G06K 7/10386* (2013.01)
USPC .............................................. 705/16; 705/21

(58) Field of Classification Search
None
See application file for complete search history.

(56) References Cited

U.S. PATENT DOCUMENTS

| | | | |
|---|---|---|---|
| 6,318,636 B1 * | 11/2001 | Reynolds et al. | 235/472.01 |
| 8,423,001 B2 * | 4/2013 | Lauper | 455/414.2 |
| 2008/0068171 A1 * | 3/2008 | Ehrman et al. | 340/572.1 |
| 2008/0100451 A1 * | 5/2008 | Wulff | 340/572.7 |
| 2008/0155768 A1 * | 7/2008 | Ziegler et al. | 15/4 |
| 2009/0167484 A1 * | 7/2009 | Burr | 340/3.31 |
| 2009/0309704 A1 * | 12/2009 | Chang et al. | 340/10.1 |
| 2010/0271802 A1 * | 10/2010 | Recker et al. | 362/20 |
| 2012/0030708 A1 * | 2/2012 | Margis et al. | 725/38 |

* cited by examiner

*Primary Examiner* — Paul Danneman
(74) *Attorney, Agent, or Firm* — Useful Arts IP

(57) ABSTRACT

A generic RFID reader is provided that can function across a large range of computing devices including mobile computing devices, without customization or with minimal customization.

29 Claims, 10 Drawing Sheets

GENERIC APPARATUS TO PROVIDE RFID
READING FUNCTIONALITY TO
COMPUTING DEVICE WITH NO BUILT IN
RFID READER

The present invention relates to RFID reading.

BACKGROUND OF THE INVENTION

Present day retailers use RFID tags, such as UHF RFID tags, to identify items, and there are many dedicated handheld RFID readers available in the market. Many RFID readers are inherently bulky thus convenience to the mobile user is drastically reduced.

Some handheld devices come with an integrated RFID reader to enable RFID functionality. However, convenience to the mobile user is reduced by the inability to detach the RFID reader even when the user does not require the RFID functionality. On the other hand, some manufacturers produce detachable RFID readers, but only to support a limited number of mobile computing devices.

Dedicated RFID readers and handheld devices with integrated RFID readers are quite expensive, since significant effort has to be put into the design to manage the inherent bulkiness.

What is needed is a generic RFID reader that can function across a large range of computing devices including mobile computing devices without customization or with minimal customization.

BRIEF DESCRIPTION OF THE DRAWING
FIGURES

The present invention may be further understood from the following Detailed Description in conjunction with the appended drawing figures. In the drawing.

DETAILED DESCRIPTION

Summary

The present invention provides a generic RFID reader that can function across a wide range of computing devices including mobile computing devices, without customization or with minimal customization.

The present generic RFID reader provides a flexible generic design for manufacturers to address the concerns described in the Background of the Invention. In particular, the generic design can be customized to support wide range mobile computing devices, with minor alterations, resulting in a lower unit cost for the manufacturer. The generic design can also be used along with non-mobile computing devices as a peripheral device to provide RFID functionality. Further, the generic design provides means to provide flexibility and to improve the convenience to the end user.

Description

Electrical Circuitry

Figure 1:
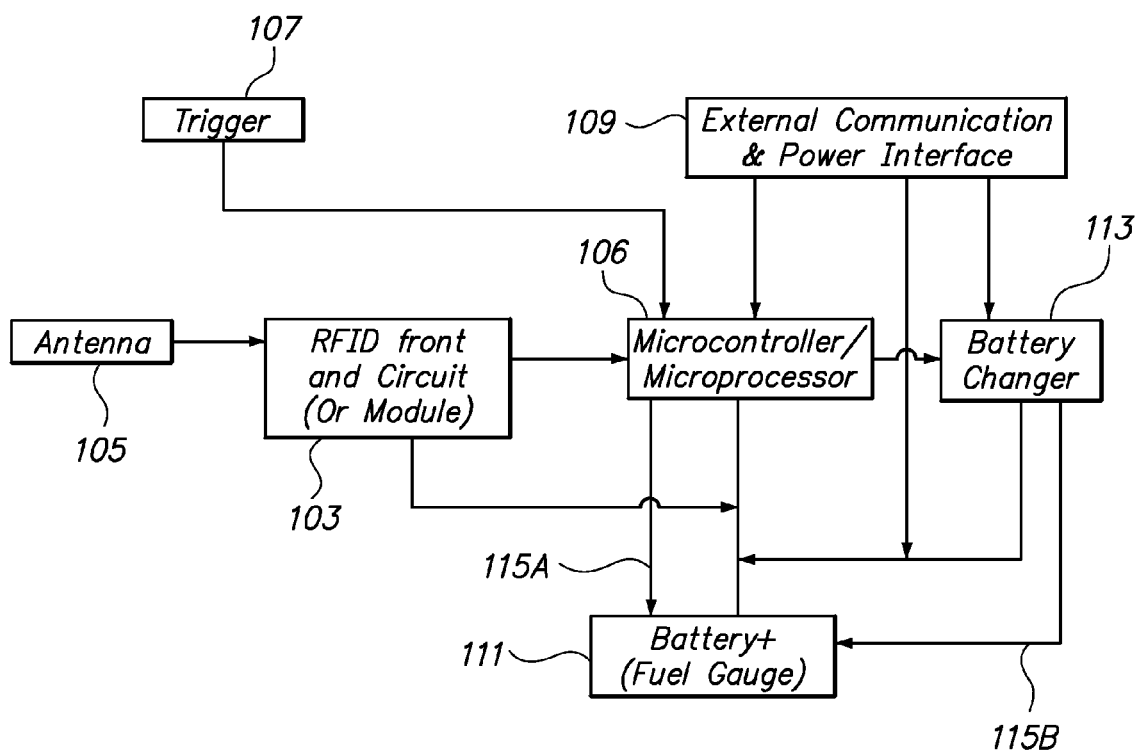
FIG. 1 is a block diagram of the electrical circuitry of a generic RFID reader.

Referring now to FIG. 1, block diagram of the electrical circuitry of one embodiment of a generic RFID reader is shown. A microcontroller/microprocessor ("microcontroller") 101 is coupled to an RFID front end circuit or module 103, which is coupled in turn to an RFID antenna 105. The microcontroller 101 is coupled also to a trigger 107 and to an external communication and power interface 109. The RFID reader may be battery powered or powered by a computing device connected to the interface 109.

If the RFID reader is battery powered, it includes a battery 111 and a battery charger 113. The battery supplies DC power to the microcontroller 101, the RFID front end circuit 103 and the interface 109, and is coupled to the battery charger 113 for charging. The battery 111 may be a smart battery that includes a "fuel gauge" or other electronics. Control lines 115A, 115B extend between the microcontroller 101 and the battery 111, and the battery charger 113 and the battery 111, respectively.

If the RFID reader is powered by a computing device connected to the interface 109, DC power to the microcontroller 101 and the RFID front end circuit 103 is supplied by the computing device.

Various optional modules may also be provided, for example but not limited to a Bluetooth module, interconnection options, etc. A printed circuit board of the RFID reader may contain routing and footprint for all the optional modules, with selected optional modules (if any) being populated.

The foregoing electrical circuitry is housed within an electronics assembly of the RFID reader.

Configuration

Figure 2A:
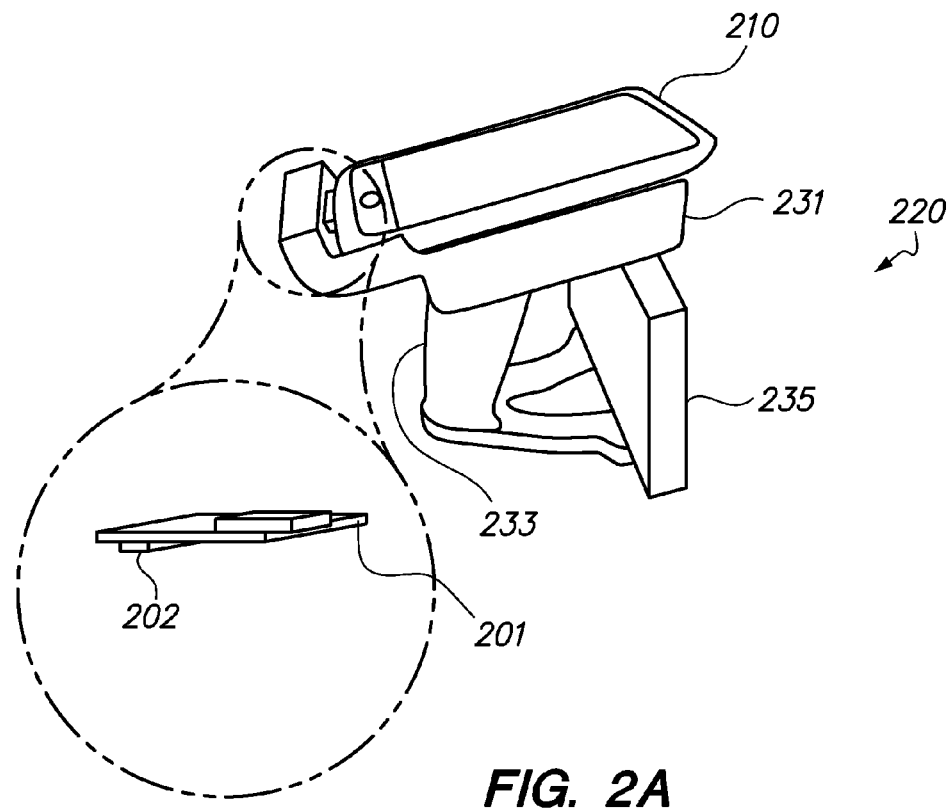
FIG. 2A is a diagram illustrating electrical connection between a generic RFID reader and a mobile electronic device in accordance with one embodiment.
Figure 2B:
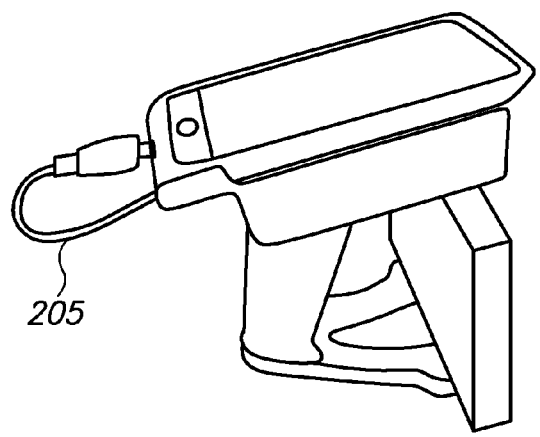
FIG. 2B is a diagram illustrating electrical connection between a generic RFID reader and a mobile electronic device in accordance with another embodiment.

An embodiment in which the mobile computing device 210 is mounted on the RFID reader 220 is referred to as an RFID sled as illustrated in FIGS. 2A and 2B.

Figure 3A:
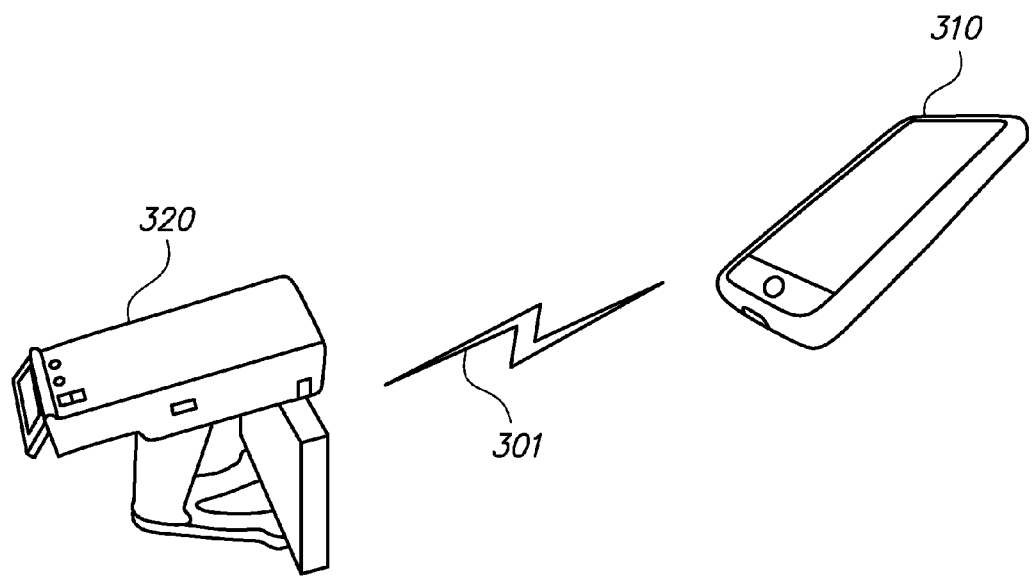
FIG. 3A is a diagram illustrating extended operation of the RFID reader of FIG. 1 using a wireless connection.
Figure 3B:
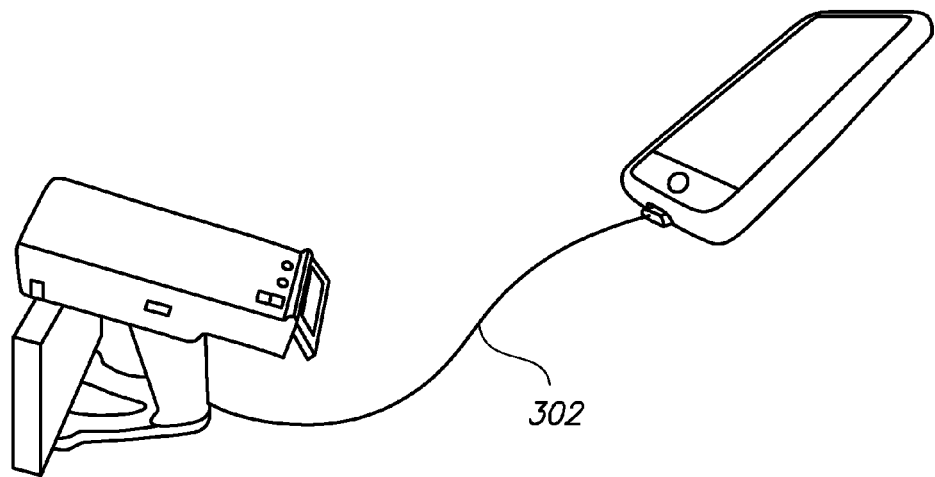
FIG. 3B is a diagram illustrating extended operation of the RFID reader of FIG. 1 using a wired connection.

In order to reduce the weight being carried by hand during operation, the RFID reader can work in an RFID extended configuration (RFID Extension) as illustrated in FIGS. 3A and 3B, without physically mounting the mobile computing device 310 on the RFID reader 320, while keeping connectivity between the mobile computing device 310 and the RFID reader 320. Some mobile computing devices are equipped with wireless connectivity methods like Bluetooth, providing a wireless link 301 which may be used for this purpose (FIG. 3A). In other instances, the mobile computing device may be connected by cable (302, FIG. 3B). In this configuration the user can carry the mobile computing device 310 in a convenient manner while maintaining the connectivity with the RFID reader 320.

Figure 4A:
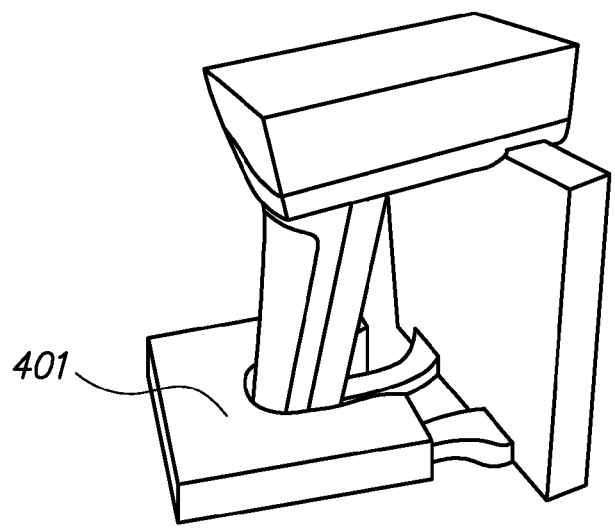
FIG. 4A is a diagram of an RFID reader docking station.
Figure 4B:
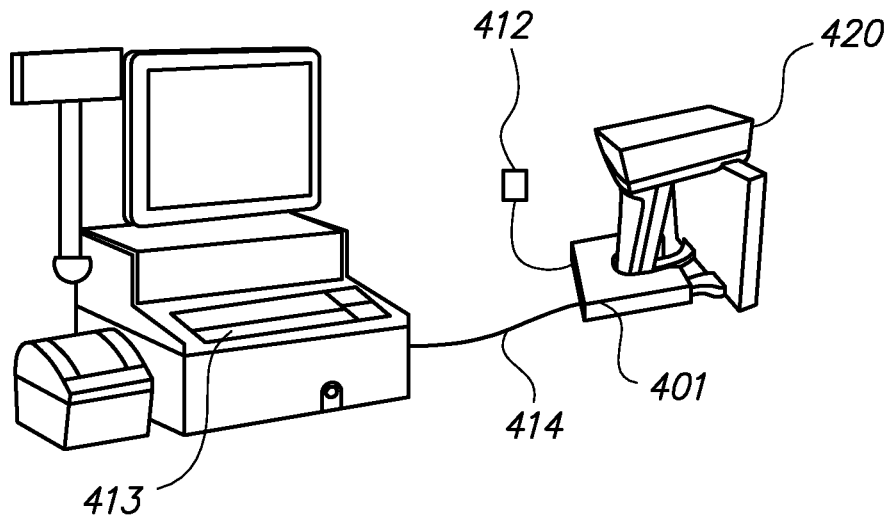
FIG. 4B: is a diagram of another RFID reader docking station which can be used at points of sale.

In other embodiments in which the computing device is a desktop computer/laptop computer/cash register ("cash register") 413 and is connected to the RFID reader 420 as illustrated in FIG. 4B, the RFID reader is referred to as an RFID peripheral.

Electric Connections

Referring to FIG. 2A, the RFID reader includes an electronics assembly 231, a grip 233, and an antenna assembly 235. The grip 233 typically includes a trigger not shown). The RFID reader of FIG. 1 may support various electrical interconnections including, for example, USB device, USB host, RS232, SPI and general purpose inputs and outputs. In one embodiment, mechanical connectors are made available for directly plugging a mobile computing device 210 into the RFID reader 220. As shown in the exploded detail, the RFID reader 220 may include an interface circuit board having a connector 201 for connecting to the mobile computing device 210, and a board-to-board connector 202 that connects to a main electrical board of the RFID reader 220. In case of a situation where the mobile computing device cannot be plugged into the available connector, for example due to orientation of the relevant electrical connector of the mobile computing device, an extension cable 205 may be provided as shown in FIG. 2B. If the electrical connector of the mobile computing device 210 is custom or non-standard, an electrical connection converter along with a cable may be used to connect the mobile computing device 210 with the RFID reader 220.

A Bluetooth module can be used to connect the mobile computing device if electrical connection is not preferred.

In one embodiment, the RFID reader 220 is provided with a programmable power outlet to charge the mobile computing device 210, such that no additional cradle is required to charge the mobile computing device. Using a programmable power supply ensures compatibility with various mobile computing devices.

Standalone Operation

For some applications, such as continuous reading operation, the kind of rich user interface that can be provided by a computing device (touch pad, keyboard, large color display, etc.) may not be required. In such instances the computing device need not be physically attached to the RFID reader. In order to reduce the weight being carried during operation, the RFID reader can work as a standalone device.

Figure 3C:
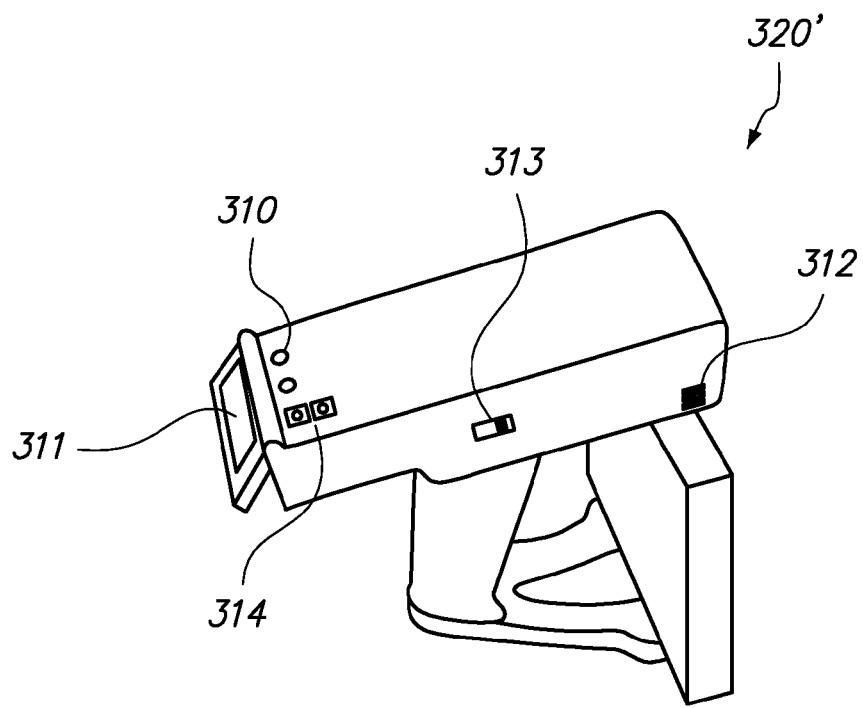
FIG. 3C is a diagram illustrating optional features available for standalone operation.

For standalone operation, the RFID reader may be equipped with user interface controls, for example but not limited to LED display, character LCD display, buzzer, vibrator, etc. Those user interface controls can be used to indicate successful read count, successful read, battery level, battery warning, etc. In the example of FIG. 3C, the RFID reader 320' is provided with indicator lamps 310, a display unit 311, a beeper/buzzer 312, an on/off switch 313, and custom user-programmable switches 314.

Figure 12:
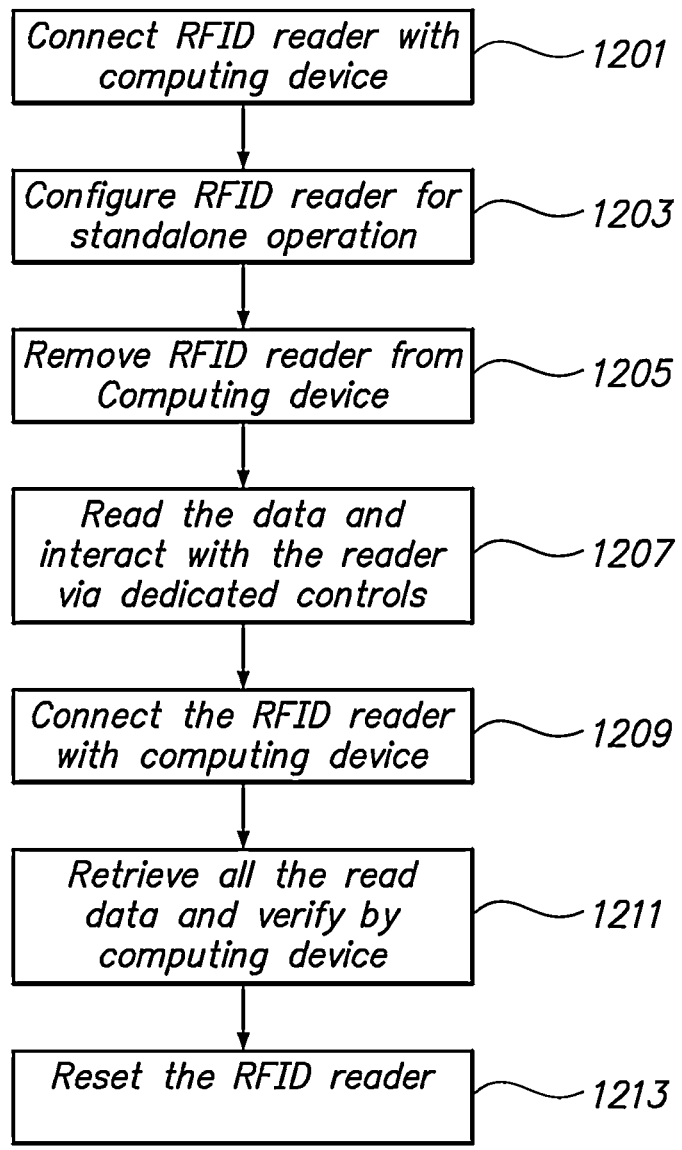
FIG. 12 is a flowchart illustrating stand-alone operation of an RFID reader in accordance with one embodiment.

In one embodiment, standalone operation of the RFID reader may be performed in accordance with the steps of FIG. 12. In step 1201, the computing device is connected to the RFID reader, after which the computing device configures the RFID reader for standalone operation (step 1203). The computing device is then removed from the RFID reader (step 1205). The RFID reader is then used in standalone mode to read data, with the user interacting with the RFID reader using dedicated controls provided on the RFID reader (step 1207). When all of the data has been read, the computing device is again connected to the RFID reader (step 1209). The computing device retrieves and verifies all the read data (step 1211). The user, if required, can use the RFID reader in the standalone mode to read data again (step 1205 followed by step 1207). If not the computing device then resets the RFID reader (step 1213).

Docking Station

Referring to FIG. 4A, a dedicated docking station or cradle 401 may be provided with the RFID reader. In one embodiment, the docking station 401 includes a battery charger and has external connections (e.g., USB, RS232 and/or Ethernet connections) which enable the RFID reader to connect with a computing device such as a point of sales register while it is being docked. FIG. 4B illustrates the RFID reader being used as a table-top RFID reader for POS applications. In this example, the docking station 401 is powered by an AC power source 412 and is connected via a USB cable 414 to a cash register 413. In other embodiments, the docking station is connected wirelessly to the cash register 413.

Construction Details

Figure 5:
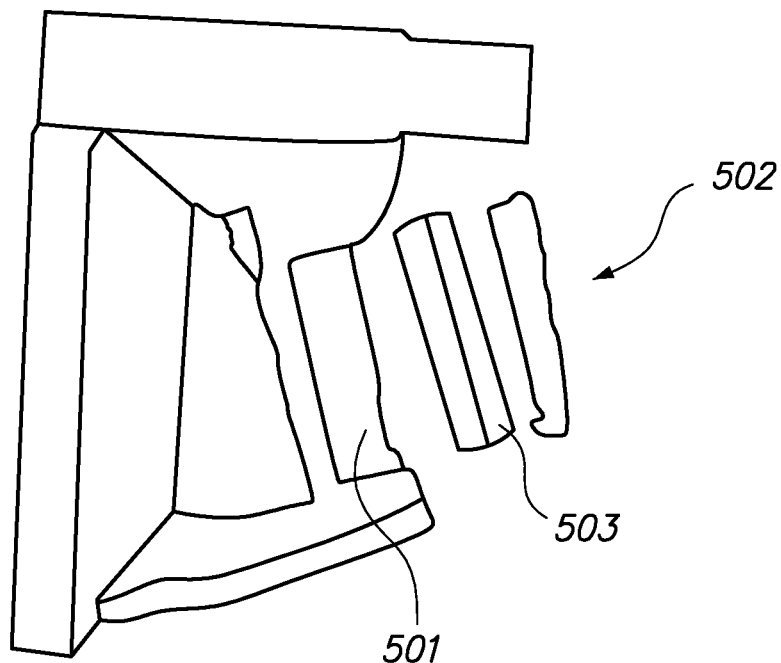
FIG. 5 is a diagram of a battery compartment of an RFID reader.
Figure 6:
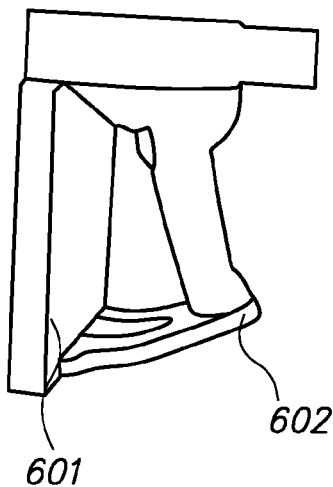
FIG. 6: is a diagram of a reinforcing support for an RFID antenna assembly.

Referring to FIG. 5, in one embodiment, the battery 503 of the RFID reader is inserted in the grip within a battery compartment 501 in order to save space and to maintain a stable centre of gravity. A battery cover 502 is provided. Referring to FIG. 6, the antenna assembly 601, which is the heaviest part of the RFID reader, may be supported by a mechanical bridge 602, which may take the form of two reinforcing bars extending from underneath the antenna assembly 601 to the bottom of the grip.

Attachment Mechanisms

Figure 7A:
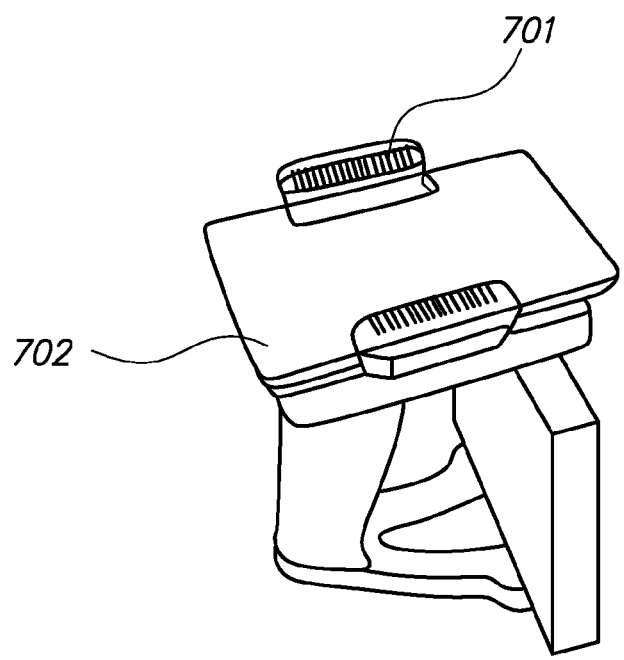
FIG. 7A is a diagram of a generic mechanical base of an RFID reader having an adjustable mechanical grip.

The generic RFID reader may use any of various different mechanisms to hold the mobile computing device such that it can be removed when required. Referring to FIG. 7A, one such technique is an adjustable mechanical grip which has adjustable rubberized jaws 701 and a rubberized plate 702. The jaws 701 can be used to hold the mobile computing device, which may be locked in place using a ratchet mechanism, for example. A mechanical interlock later releases the ratchet. The size and number of the jaws may be changed in order to support various sizes of mobile computing devices.

Figure 7B:
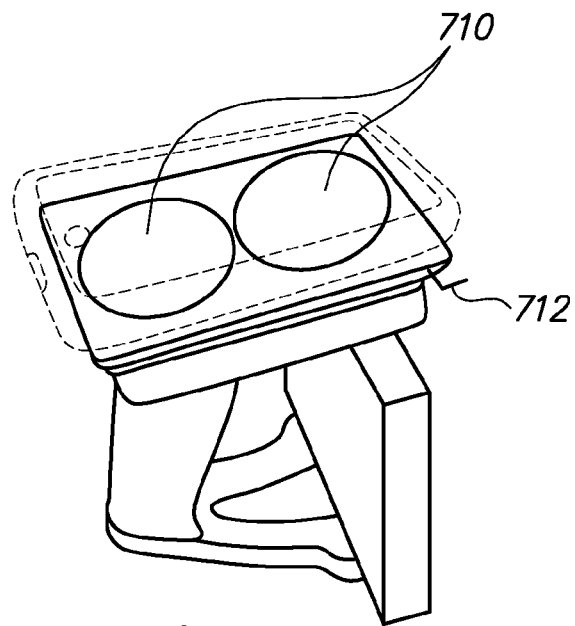
FIG. 7B is a diagram of a generic mechanical base of an RFID reader having a suction-based device fastening method.

Referring to FIG. 7B, in another embodiment, the bed of the generic mobile computing device is provided with suction pads 710, allowing the mobile computing device to be fixed in place on the suction pads. A mechanical lock release 712 is used to release the suction pads.

In another embodiment (not shown), electroadhesion is used to fix the mobile computing device. The bed of the RFID reader is provided with electroadhesion material and internal circuitry capable of powering the electroadhesion material. This technique allows for particularly easy fixation and release. Internal firmware may indicate remaining holding time according to the battery level. In accordance with still a further embodiment, one or more magnetic strips are glued or otherwise attached to the backside of the mobile computing device so that it can be fixed on the metallic (e.g., iron or other ferromagnetic material) bed of the generic RFID reader or vice versa.

Figure 7C:
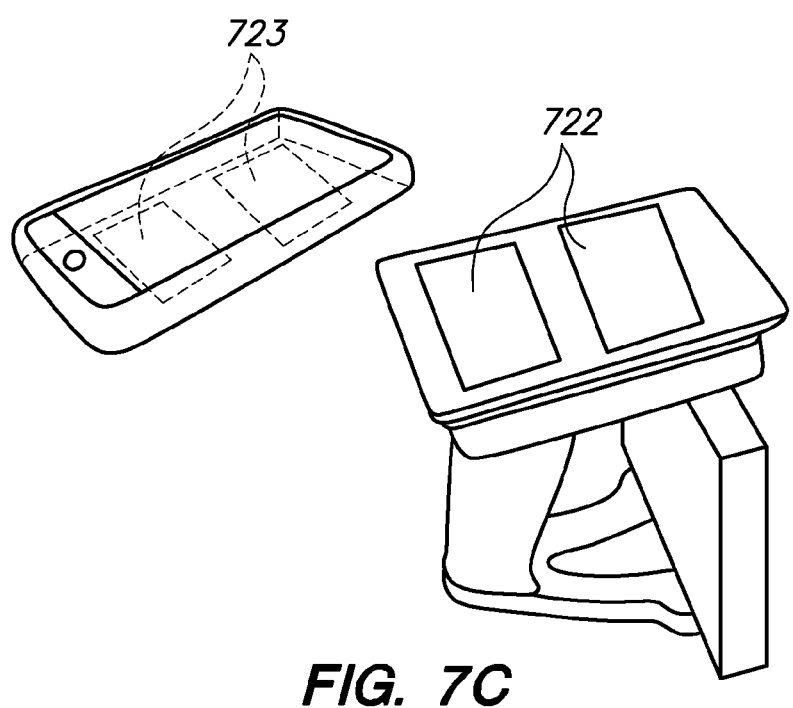
FIG. 7C is a diagram of a generic mechanical base of an RFID reader having a fabric hook-and-loop fastener mechanism.

Referring to FIG. 7C, in yet another embodiment, fabric hook-and-loop fasteners may be used to fix the mobile computing device. Hook side or loop side 723 is glued to the backside of the mobile computing device. The opposite type of hook-and-loop fastener 722 is glued on the bed of the generic RFID reader.

Figure 10:
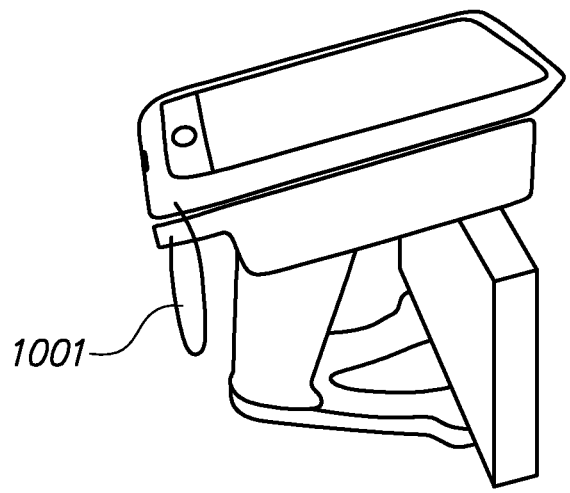
FIG. 10 is a diagram illustrating use of a safety strap with an RFID reader and a mobile computing device.

In each of the foregoing embodiments, a safety strap may be connected between the mobile computing device and the RFID reader in order to prevent damage caused by accidental separation of the mobile computing device from the RFID reader. Use of a safety strap 1001 is shown in FIG. 10.

Adjustable Base

Figure 7D:
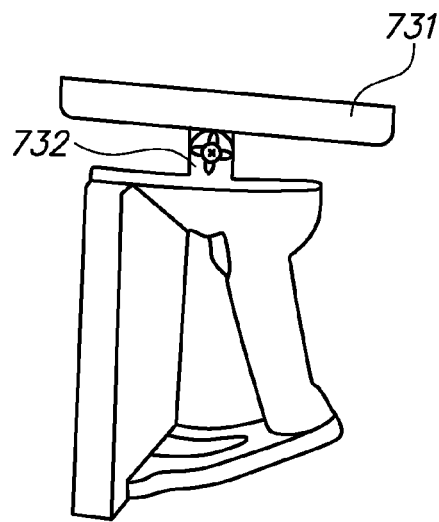
FIG. 7D is a diagram of an adjustable swivel-tilt mechanical base.

To satisfy a range of user requirements, various mounting options may be provided for the mobile computing device. If the mobile computing device has a barcode scanner on the top edge, horizontal mounting is preferred. Referring to FIG. 7D, the bed or holder 731 of the generic RFID reader is rotatable such that the angle of the top surface (display, touch pad and keyboard) of the mobile computing device can be adjusted according to user requirements. Once it is adjusted it can be locked using a knob 732. In some embodiments, the bed 731 may also be the housing of the electronics assembly.

Figure 8:
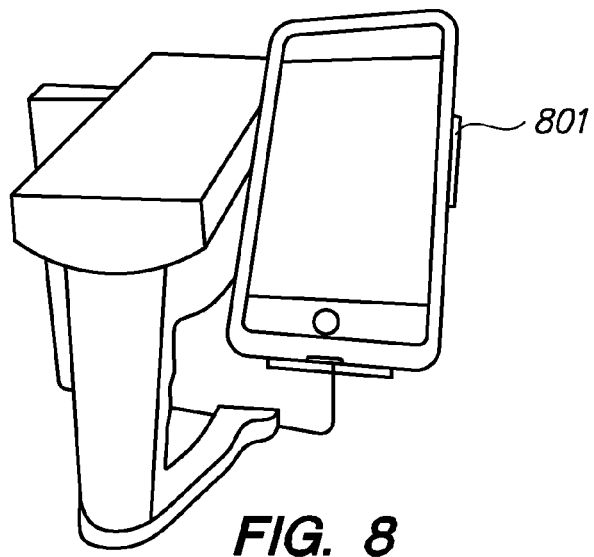
FIG. 8 is a diagram illustrating another mounting option.

If the mobile computing device is small and it has a camera in the backside, vertical mounting is preferred. Different positions may be provided for according to handedness of the user. Vertical mounting for a right-handed user using a mounting mechanism (holder) 801 is shown in FIG. 8, where the mounting mechanism may also provide a swivel action.

Figure 9:
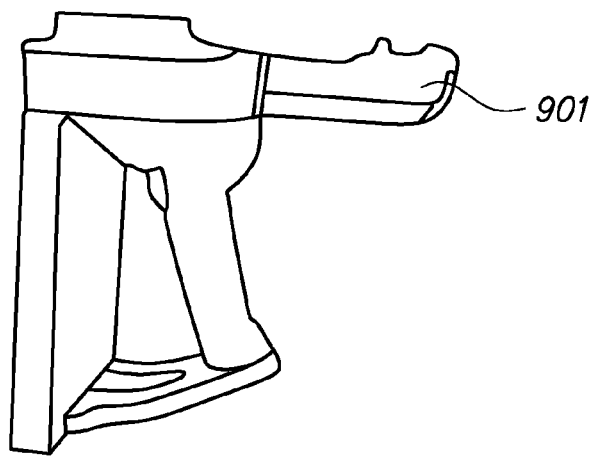
FIG. 9 is a diagram illustrating a custom device holder.

A mobile computing device of unusual shape or bulkiness may not allow for ready mounting using any of the mounting options of the generic RFID reader previously described. In this scenario, a custom device carriage 901 can be fixed on the bed of the generic RFID reader as shown for example in FIG. 9.

Other Features

Trigger Latch. Taking down a large stock requires frequent activation of the trigger button. The RFID reader may be provided with a feature to latch the trigger button either mechanically or programmatically. A visual indication through LCD/LED or unique audible indication through a buzzer can be given to indicate the mode.

Power Saving Mode. Firmware of the RFID reader may be programmed to identify a user idle mode, for example using a motion sensor or by sensing idleness of the trigger button. When an idle condition is detected, the firmware sends the device to low power mode in order to save power.

Figure 11:
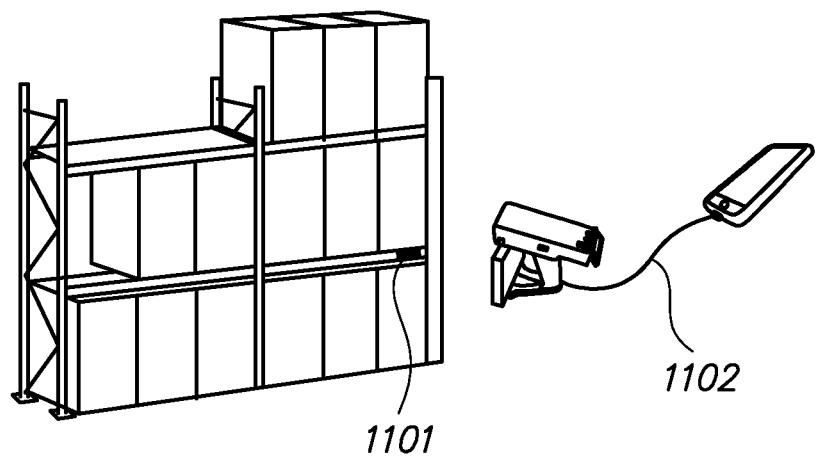
FIG. 11 is a diagram illustrating an arrangement in which location information is read by RFID reader and sent to an application together with other RFID information.

Augmenting With Location Data. In some instances, it may be desirable to augment tag data with location data. For this purpose, specific RFID tags 1101 programmed with location information may be placed on the shelves of the store or other facility, as shown in FIG. 11. The RFID reader reads the location tag and sends to the computing device information 1102 including both location information and data read from other RFID tags.

It will be apparent to those of ordinary skill in the art that the present invention can be embodied in other specific forms without departing from the spirit or essential character thereof. The foregoing description is therefore to be regarded as illustrative, not restrictive. The scope of the invention is defined by the appended claims, not the foregoing description, and all changes which some within the range of scope of equivalents thereof are intended to be embraced therein.

What is claimed is:

1. A Radio Frequency IDentification (RFID) reader apparatus for adding RFID functionality to a range of computing devices from multiple different manufacturers that lack RFID reading capability, including mobile computing devices, comprising:

an electronics assembly comprising means for establishing communication between the said electronics assembly and the computing device that lacks RFID reading capability;

RFID front-end circuitry coupled to said electronics assembly;

an antenna assembly coupled to said RFID front-end circuitry;

a grip comprising a trigger coupled to said electronics assembly; and adjustable mounting means for mechanically connecting the computing device and said RFID reader apparatus.

2. The RFID reader apparatus of claim 1, wherein the RFID reader apparatus is powered by at least one of:

one or more dedicated rechargeable batteries;

the computing device attached to the RFID reader apparatus;

an external power adapter;

a docking station which receives the RFID reader apparatus.

3. The RFID reader apparatus of claim 2, wherein the RFID reader apparatus is powered by at least the one or more dedicated rechargeable batteries, further comprising a dedicated docking station configured to power said RFID reader apparatus and charge said rechargeable batteries.

4. The RFID reader apparatus of claim 3, wherein the docking station provides at least one of following wired communication methods for maintaining communication between the RFID reader apparatus and a non-mobile computing device while the said RFID reader apparatus is docked on said docking station: USB device, USB Host, RS323, Ethernet.

5. The RFID reader apparatus of claim 1, wherein the means for establishing communication between said RFID reader apparatus and computing device comprises a wired connector comprising connections for one or more of the following wired communication methods: USB device, USB host, RS232, SPI, and GPIO.

6. The RFID reader apparatus of claim 1, wherein the means for establishing wireless communication comprises Bluetooth communication circuitry.

7. The RFID reader assembly of claim 1, wherein the electronics assembly comprises a printed circuit board, wherein various modes of communication including wired and wireless communication are provided for by said printed circuit board, and wherein the printed circuit board is populated to provide for only a selected subset of the various different modes of communication.

8. The RFID reader apparatus in claim 1, wherein the RFID reader apparatus is configured to provide a standalone method of operation, the stand-alone mode of operation comprising:

coupling a computing device and the RFID reader;

using the computing device, configuring the RFID reader for stand-alone operation;

de-coupling the computing device and the RED reader;

using the RFID reader in standalone mode to read RFID information;

re-coupling the computing device to the RFID reader; and transferring the RFID information to the computing device.

9. The RFID reader apparatus in claim 1, wherein the RFID reader apparatus is configured to operate while the computing device is not physically mounted on said mount, wherein connectivity with the computing device is maintained.

10. The RFID reader apparatus in claim 9 wherein connectivity with the computing device is maintained via Bluetooth.

11. The RFID reader apparatus in claim 9 wherein connectivity with the computing device is maintained via a USB cable.

12. The RFID reader apparatus in claim 1 comprising dedicated UI controls comprising an input/output section, the input/output section comprising a display, one or more indicator lights, one or more input switches and a buzzer.

13. The RFID reader apparatus in claim 1 comprising a trigger latch, configured for reading tags continuously without pressing the trigger button per read, or without keeping the trigger button pressed throughout the reading period, wherein the trigger latch comprises one of a mechanical latch trigger and a firmware based trigger latch.

14. The RFID reader apparatus of claim 1, wherein the adjustable mounting means comprises a mechanical grip comprising a ratchet mechanism and a plurality of rubberized jaws.

15. The RFID reader apparatus of claim 14, comprising a release for releasing the ratchet mechanism.

16. The RFID reader apparatus of claim 1, wherein the adjustable mounting means comprises a plurality of suction pads.

17. The RFID reader apparatus of claim 16, comprising a release for releasing suction of the suction pads.

18. The RFID reader apparatus of claim 1, wherein the adjustable mounting means comprises hook-and-loop fastener material.

19. The RFID reader apparatus of claim 1, wherein the adjustable mounting means comprises an electro-adhesion bed activated by an electric assembly.

20. The RFID reader apparatus of claim 1, wherein the adjustable mounting means is ferromagnetic so as attract one or more magnetic strips affixed to a mobile computing device or vice versa.

21. The RFID reader apparatus of claim 1, wherein the adjustable mounting means comprises a custom made device holder configured to hold a particular mobile computing device of non-standard configuration.

22. The RFID reader apparatus of claim 1, wherein the adjustable mounting means comprises a rotatable holder configured for adjusting an angle of a front plane of the mobile computing device.

23. The RFID reader apparatus of claim 1, wherein the adjustable mounting means is configured such that a mobile computing device may be fixed in multiple ones of the following positions relative to the RFID reader: vertical, horizontal and slanted.

24. The RFID reader apparatus of claim 1, comprising a safety strap coupled to the RFID reader to prevent damage in case of accidental separation of the mobile computing device from the RFID reader.

25. The RFID reader apparatus of claim 1, wherein the electronic assembly comprises firmware for controlling operation of the RFID reader, wherein the firmware of the RFID reader is configured for reading location RFID tags and combining the read in location information along with data from the reading of one or more other RFID tags.

26. The RFID reader apparatus of claim 1, wherein the electronic assembly comprises a programmable power supply for charging the mobile computing device.

27. A stand-alone method of operating an RFID reader configured as an RFID sled, RFID extension or RFID peripheral, the stand-alone mode of operation comprising:
   coupling a computing device and the RFID reader, wherein the computing device lacks RFID reading capability;
   using the computing device, configuring the RFID reader for stand-alone operation;
   de-coupling the computing device and the RFID reader;
   using the RFID reader in stand-alone mode to read RFID information;
   re-coupling the computing device to the RFID reader; and
   transferring the RFID information to the computing device.

28. A system in which an RFID reader is used as a table-top RFID reader for point-of-sale applications, comprising:
   an RFID reader;
   a docking station for receiving the RFID reader and supplying power to the RFID reader; and
   a POS register;
   wherein the docking station is coupled with the POS register via at least one of a wired connection and a wireless connection.

29. An RFID reader comprising controller firmware configured for reading location information from location RFID tags and combining the read-in location information along with data from the reading of one or more other RFID tags.

* * * * *